US007797225B1

(12) United States Patent
Kemp et al.

(10) Patent No.: US 7,797,225 B1
(45) Date of Patent: Sep. 14, 2010

(54) SHARIA COMPLIANT PERFORMANCE LINKED NOTE

(75) Inventors: David Kemp, London (GB); Idayu Zainuddin, London (GB)

(73) Assignee: UBS AG, Zurich (CH)

( * ) Notice: Subject to any disclaimer, the term of this patent is extended or adjusted under 35 U.S.C. 154(b) by 205 days.

(21) Appl. No.: 11/758,977

(22) Filed: Jun. 6, 2007

Related U.S. Application Data (60) Provisional application No. 60/879,807, filed on Jan. 11, 2007.

(51) Int. Cl.
*G06Q 40/00* (2006.01)
(52) U.S. Cl. .......................... 705/37; 705/35
(58) Field of Classification Search ............ 70/37
See application file for complete search history.

(56) References Cited

U.S. PATENT DOCUMENTS

| | | | |
|---|---|---|---|
| 7,295,987 B2 | 11/2007 | Graff | |
| 2002/0077949 A1* | 6/2002 | Qasem et al. | 705/36 |
| 2003/0229555 A1* | 12/2003 | Marlowe-Noren | 705/35 |
| 2003/0233324 A1 | 12/2003 | Hammour et al. | |
| 2004/0107152 A1* | 6/2004 | Marlowe-Noren | 705/35 |
| 2004/0177029 A1 | 9/2004 | Hammour et al. | |
| 2004/0225589 A1* | 11/2004 | Marlowe-Noren | 705/35 |
| 2004/0236654 A1* | 11/2004 | Marlowe-Noren | 705/35 |
| 2005/0044022 A1* | 2/2005 | Spirgel et al. | 705/35 |
| 2006/0136313 A1* | 6/2006 | Driver et al. | 705/35 |
| 2006/0190373 A1 | 8/2006 | Perg et al. | |
| 2006/0208061 A1 | 9/2006 | Carragher | |
| 2006/0212374 A1 | 9/2006 | Marlowe-Noren | |
| 2007/0038551 A1* | 2/2007 | Shah | 705/37 |
| 2007/0106579 A1* | 5/2007 | Al-Saleh | 705/35 |
| 2007/0192238 A1 | 8/2007 | Shata et al. | |

OTHER PUBLICATIONS

"Raiffeisen Zentralbank sterreich and WestLB launch US $100m Standby Commodity Murabaha Financing for Gulf Finance House", Middle East Company News. Dubai: Nov 7, 2006 p. 1.*
"Managing Financial Risks of Sukuk Structures", Ali Arslan Tariq, M.Sc. International Banking, Sep. 2004.*
"DMCC Announces US 200 million dollar Gold related Financing", Middle East Company News. Dubai: Feb. 10, 2005 p. 1.*

(Continued)

*Primary Examiner*—James P Trammell
*Assistant Examiner*—Mohammad Z Shaikh
(74) *Attorney, Agent, or Firm*—Pillsbury Winthrop Shaw Pittman LLP (57) ABSTRACT

Embodiments of systems and methods relate to the issuing, servicing, and redeeming of investment notes that are linked to the performance of a single commodity or basket of commodities and are compliant with and tradable under Sharia principles. An exemplary method for administering an investment note compliant with Sharia principles involves establishing an agency contract between an agent and a trustee wherein the agent acts on behalf of the trustee and the trustee acts on behalf of the investor, establishing a unilateral purchase agreement between the agent and the issuer under which the issuer promises to buy commodities from the agent, and purchasing, by the agent, a commodity such that the agent holds title to the commodity on behalf of the trustee.

23 Claims, 9 Drawing Sheets

OTHER PUBLICATIONS

"Guide to Shariah Compliant Financial Techniques", Anonymous. Middle East. London: Oct. 2006, Iss 371; p. 41, 4 pgs.*

"BIsB and BBK jointly provide BD4.8 million finance to Tameer", Middle East Company News. Dubai: Apr. 12, 2007. p. 1.*

"Middle East securitization: Can we start now, please", International Financial Law Review, p. NA. Oct. 2006.*

"AME Info, Abu Dhabi, United Arab Emirates, financial briefts column", KBTN Knight-Ridder Tribune Business News-Ame Info-Abu Dhabi, UNI Jun. 19, 2006.*

Dr. Sabahuddin Azmi, "Structure and performance of Islamic investment funds-II", Business Recorder, Apr. 24, 2005.*

Shabuddin Azmi, "Islamic investment funds: structure and performance", Business Recorder, Feb. 22, 2006.*

Robert Fugard, Olga Petrovic, "Think Islamic: airlines looking for financing should consider Islamic finance", Airfinance Journal, Sep. 2004, n 273, p. 28.*

Ali, Arslan Tariq, "Managing Financial Risks of Sukuk Structures" M.Sc. International Banking, Sep. 2004.*

"Guide to Shariah Compliant Financial Techniques", Anonymous, Middle East. London: Oct. 2006, Iss 371; p. 41, 4 pgs.*

* cited by examiner

SHARIA COMPLIANT PERFORMANCE LINKED NOTE

This application claims the benefit of U.S. Provisional Application No. 60/879,807, filed Jan. 11, 2007, which is herein incorporated by reference in its entirety.

BACKGROUND OF THE INVENTION

Field of the Invention

Embodiments of the present invention relate to systems or methods for issuing financial investment notes or certificates. More particularly, embodiments of the present invention relate to systems and methods for issuing, servicing, and redeeming investment notes linked to the performance of a commodity or basket of commodities and tradable under Sharia (Islamic Law) principles.

DEFINITIONS

Sharia: Used to refer to the Islamic law.
Riba: In conventional terms, "riba" and "interest" are used interchangeably.
Riba, in all forms, is prohibited in Islam.
Wa'ad: A unilateral purchase agreement.
Wakala: A contract of agency.
Wakeel: Agent.
Sharia compliant: Approved by one or more Sharia scholars as in compliance with Sharia and documented in accordance with Sharia principles. The Sharia scholars can comprise multiple scholars serving together on a Sharia board or advisory committee.
Financial Investment Note or Certificate: A promise to pay an investor the principal of his investment and usually some additional risk premium at a later date in return for the investor's original investment.

BACKGROUND INFORMATION

A promissory note is a promise to pay. A financial investment note or certificate is a promise to pay an investor the principal of his investment and usually some additional risk premium at a later date in return for the investor's original investment. A certificate is a registered note, for example. The risk premium returned to an investor can include, but is not limited to, an interest rate or a return on a financial instrument. A financial instrument can include, but is not limited to, a commodity, a stock, a bond, or a derivative.

Figure 1:
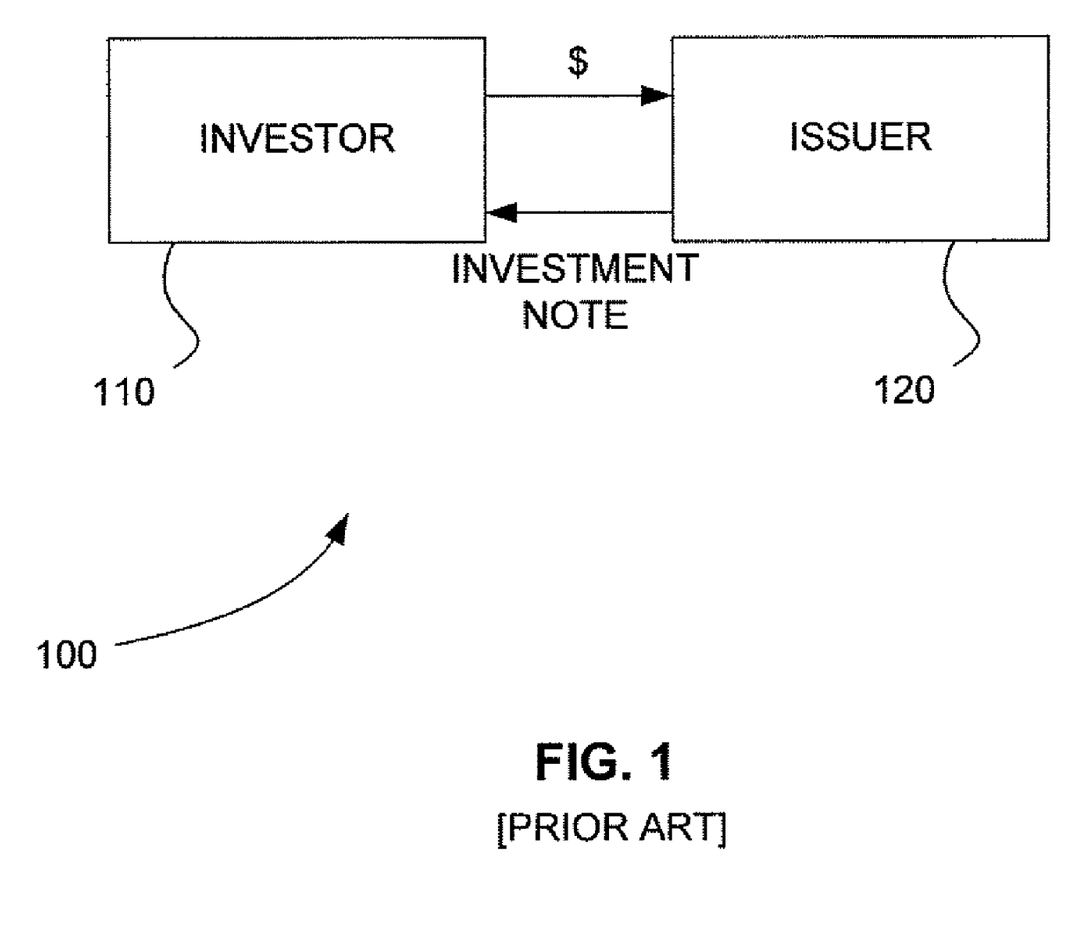
FIG. 1 is a schematic diagram of an issuance of an exemplary investment note to an investor.

FIG. 1 is a schematic diagram of an issuance 100 of an exemplary investment note to investor 110. For example, investor 110 gives money to issuer 120 in return for the investment note. Issuer 120 can be, but is not limited to, a broker, bank, or an investment bank. The investment note is typically a promise to pay investor 110 the money invested plus some risk premium at a later time, assuming the investment gains value. In the case in which the investment loses value and the principal is not protected, the investment note typically promises to pay any remaining portion of the money invested. The investment note, for example, describes the amount of money invested, the terms of repayment (if any), the risk premium to be paid, and the time frame for repayment, Issuer 120 can, for example, freely invest the money paid by the investor in order to raise the risk premium, pay issuer 120 expenses, and make a profit.

Figure 2:
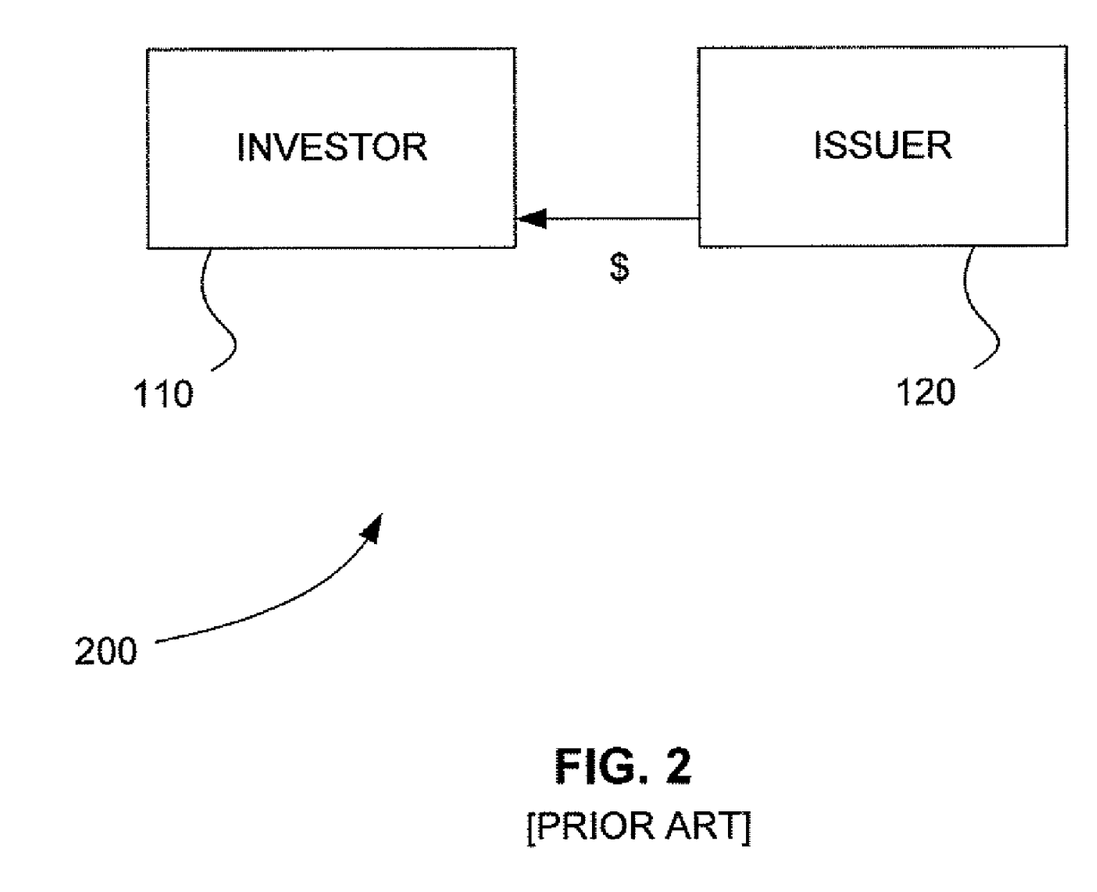
FIG. 2 is a schematic diagram of a servicing of an exemplary investment note to an investor.

FIG. 2 is a schematic diagram of a servicing 200 of an exemplary investment note to investor 110. At servicing 200, investor 110 receives money from issuer 120, for example, through a paying agent of the issuer 120. Servicing 200 of the investment note takes place sometime after the issue date. Servicing 200 of the investment note can include periodic payments of the principal, risk premium, or principal and risk premium. These periodic payments can be, but are not limited to, coupons. The terms of the servicing of an investment note are typically described by the investment note.

Figure 3:
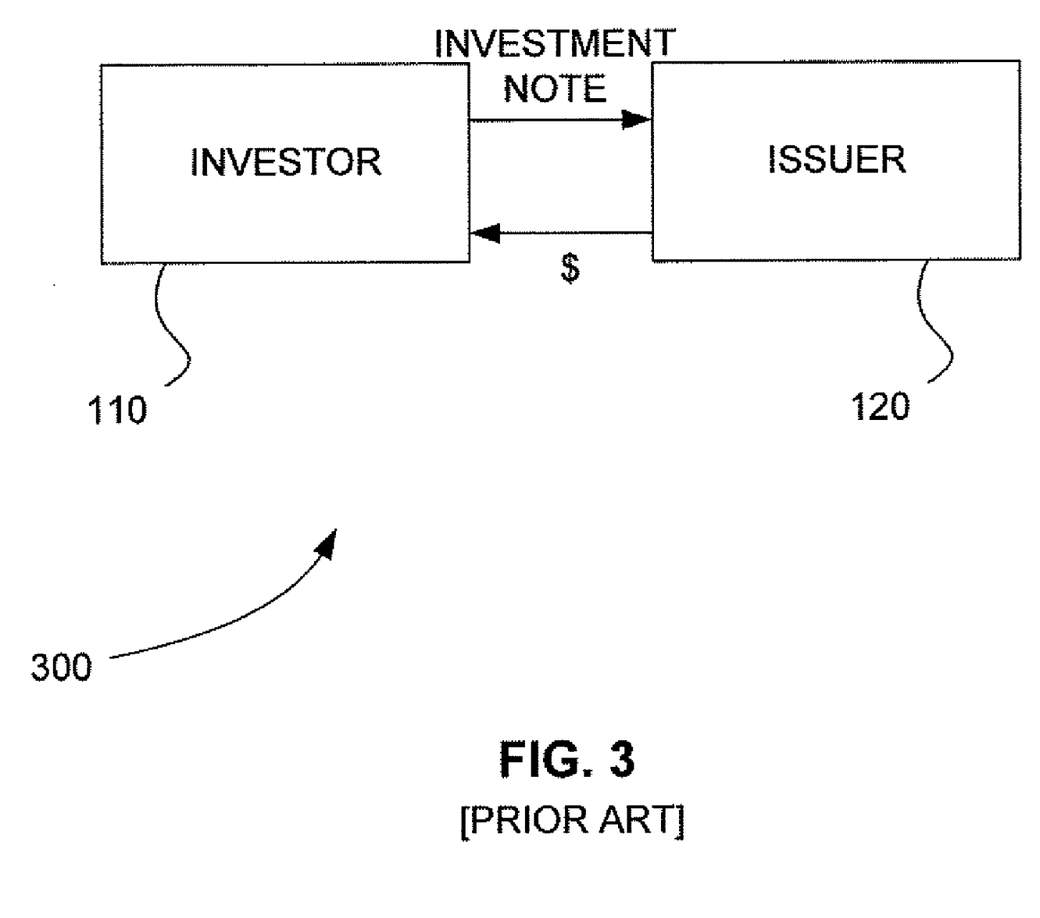
FIG. 3 is a schematic diagram of a redemption of an exemplary investment note to an investor.

FIG. 3 is a schematic diagram of a redemption 300 of an exemplary investment note to investor 110. At some time after the issue date and after any servicing payments, the investment note is redeemed. Issuer 120, for example, through a paying agent, pays money to investor 110. This money can include any remaining principal, risk premium, or principal and risk premium. The redemption could be, for example, at less than par or at 0%. In return for the payment made to investor 110, the note is redeemed, the obligation is fulfilled, and the entire financial transaction is completed.

Between issuance 100 and redemption 300, issuer 120 is typically free to invest the money paid by investor 110 in any way. Often, however, issuer 120's investment choices or actions do not meet with the requirements of an investor 110 who follows Sharia principles.

An Islamic investor can require that Sharia principles govern an investment, which can limit the structure of an investment. Sharia restrictions include, but are not limited to, a prohibition on interest payments and the requirement that an Islamic investor hold an undivided beneficial interest in a physical asset. Typical investment notes, such as illustrated in FIGS. 1-3, fail to meet these requirements principally because the performance of the notes is not linked to any beneficial interest in a physical asset.

In view of the foregoing, it can be appreciated that a substantial need exists for systems and methods that provide investment notes linked to beneficial interests in physical assets and are tradable under Sharia principles.

SUMMARY OF THE INVENTION

Embodiments of the present invention provide systems and methods for delivering to investors an investment that is Sharia compliant and has a return risk profile consistent with comparable non-Sharia-compliant investments. The embodiments of the invention provide for the issuing, servicing, and redeeming of investment notes that are linked to the performance of a single commodity or a basket of commodities, and are tradable under Sharia principles. In this manner, the investment notes are linked to beneficial interests in physical assets and have an associated physical title.

In one aspect, a Sharia compliant investment note is linked to the performance of an oil (e.g., West Texas Intermediate (WTI)), a base metal (e.g., copper), or a precious metal, and is certified as Sharia compliant by one or more Sharia scholars. Optionally, the investment note can be 100% principal protected on the maturity date.

An alternative embodiment of the present invention provides a nontradable Sharia compliant investment note.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Embodiments of systems and methods related to issuing, servicing, and redeeming investment notes linked to the performance of a single commodity or basket of commodities and tradable under Sharia principles are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

Figure 4:
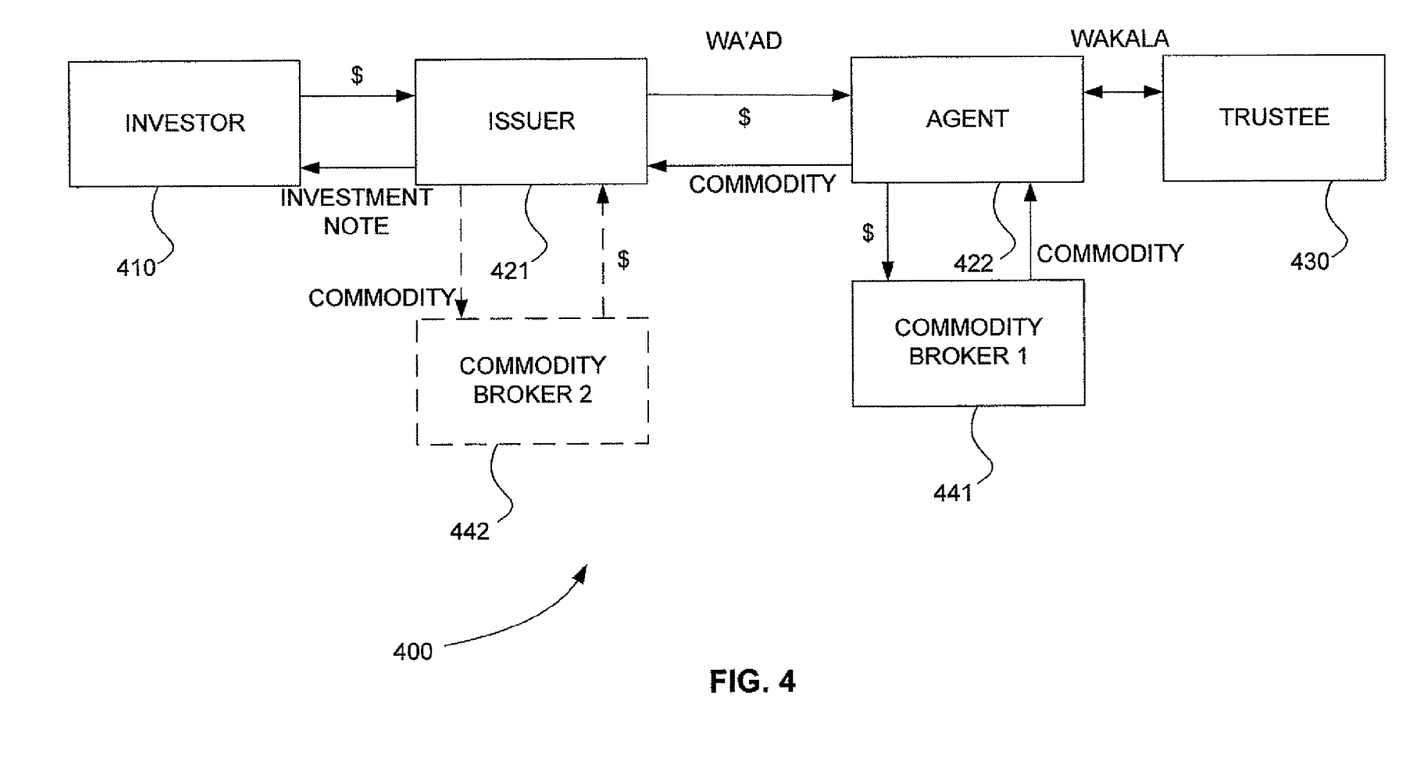
FIG. 4 is a schematic diagram of a system for issuing Sharia compliant performance linked notes, in accordance with an embodiment of the present invention.

FIG. 4 is a schematic diagram of a system 400 for issuing Sharia compliant performance linked notes, in accordance with an embodiment of the present invention. System 400 includes investor 410, issuer 421, agent 422, trustee 430, commodity broker 441, and commodity broker 442. On an issue date, issuer 421 issues investment notes to investor 410. Investor 410, in turn, pays a purchase price to issuer 421. The purchase price is paid in cash, for example. The net proceeds of the purchase price (e.g., subscription proceeds of the investment certificates less fees) are paid by issuer 421 to agent 422 and satisfy the payment amount under a Wakala entered into between agent 422 and trustee 430. A Wakala is an agency contract, and agent 422 is an agent of trustee 430, for example, Trustee 430 is, for example, a professional third party trustee, who is independent of agent 422 and can receive a fee paid by investor 410 and/or issuer 421 for acting as trustee. The appointment, duties, and responsibilities of the trustee 430 can be documented in an English law governed trust deed, for example.

Agent 422, as agent of trustee 430 buys one or more commodities from commodity broker 441. A commodity is, for example, a base metal (e.g., copper or aluminum), a precious metal, or oil (e.g., WTI). Agent 422 buys the base metal from commodity broker 441 on spot delivery and payment terms (e.g., immediate delivery and payment based on the settlement conventions of the particular market). Optionally, a fee is paid to commodity broker 441 for the trade (e.g., a fee of USD50 per USD 1m is payable per trade, where a trade equals one buy and one sell). Agent 422, as agent of trustee 430, then immediately (e.g., in the same day) sells the one or more commodities to issuer 421 acting as principal. Agent 422 sells the one or more commodities to issuer 421 for spot delivery, for example. Issuer 421 buys the one or more commodities under a Wa'ad. A Wa'ad is a unilateral purchase agreement, which issuer 421 executes in favor of agent 422 acting for trustee 430, who is acting on behalf of investor 410.

In an optional step, as indicated by the dashed lines, after issuer 421 buys the one or more commodities under a Wa'ad, issuer 421, in turn, immediately (e.g., in the same day) sells the one or more commodities to commodity broker 442. Issuer 421 sells the one or more commodities to commodity broker 442 on spot delivery, for example.

Figure 5:
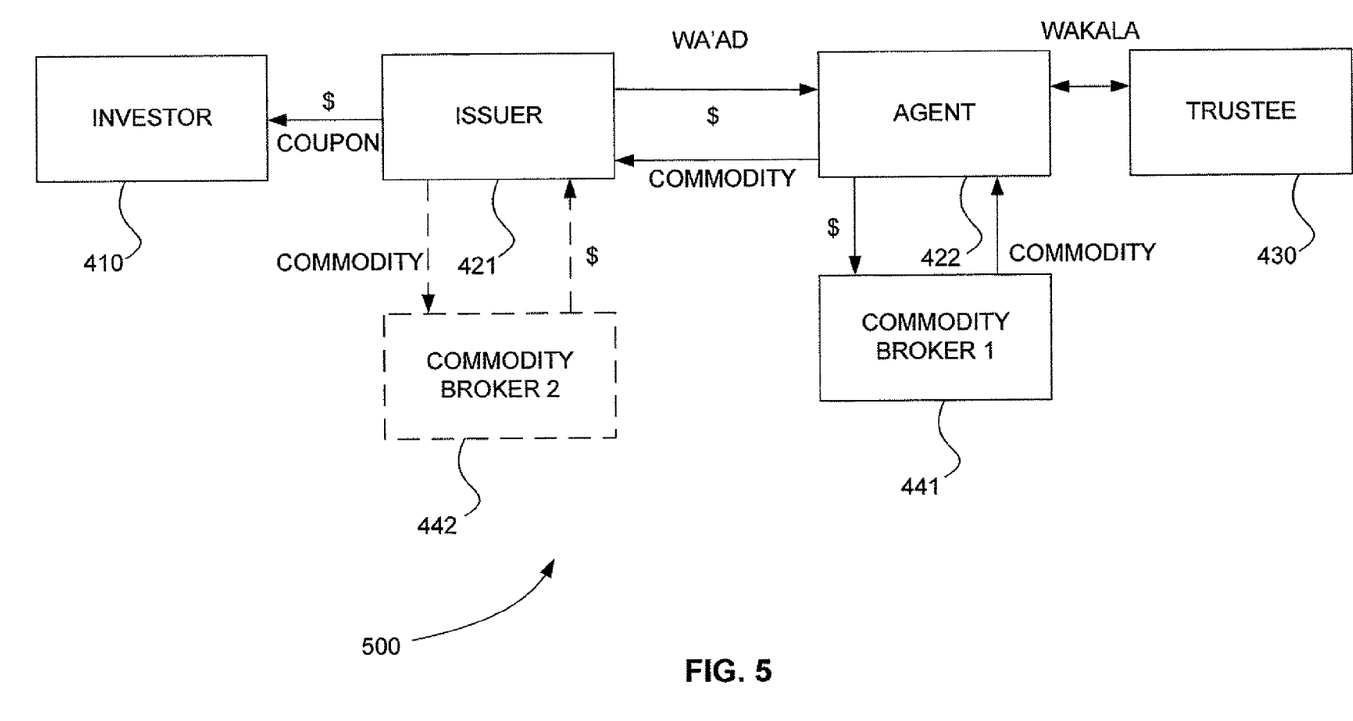
FIG. 5 is a schematic diagram of a system for servicing Sharia compliant performance linked notes, in accordance with an embodiment of the present invention.

FIG. 5 is a schematic diagram of a system 500 for servicing Sharia compliant performance linked notes, in accordance with an embodiment of the present invention. Servicing of the Sharia compliant performance linked notes can include periodic payments of the principal, risk premium, or principal and risk premium. These periodic payments can be, but are not limited to, coupon payments.

System 500 includes investor 410, issuer 421, agent 422, trustee 430, commodity broker 441, and commodity broker 442. On a payment or coupon date, agent 422, as agent of trustee 430, purchases one or more commodities from commodity broker 441. Agent 422 purchases base metal from commodity broker 441 on spot delivery and payment terms, for example. Immediately (e.g., in the same day), agent 422, as agent of trustee 430, sells the one or more commodities to issuer 421 (as principal). Issuer 421 buys base metal from agent 422 on spot delivery and payment terms in accordance with the Wa'ad.

The purchase price is determined in accordance with a formula and need not be determined with regard to the market value of the one or more commodities. The performance of copper is, for example, $$\frac{(CF - CI)}{CI}$$

where CI is the value of a copper index five business days prior to an issue date, and CF is the value of the copper index five business days prior to the return payment date. In an alternative embodiment of the present invention, the purchase price paid by issuer 421 is the price of the one or more commodities less the periodic payment owed to investor 410 under the investment note and less any fees owed to issuer 421.

In an optional step, as indicated by the dashed lines, issuer 421 immediately (e.g., in the same day) sells the one or more commodities to commodity broker 442. Issuer 421 sells the base metal to commodity broker 442 for spot delivery, for example.

Issuer 421 then pays investor 410 a periodic payment according to the formula.

Figure 6:
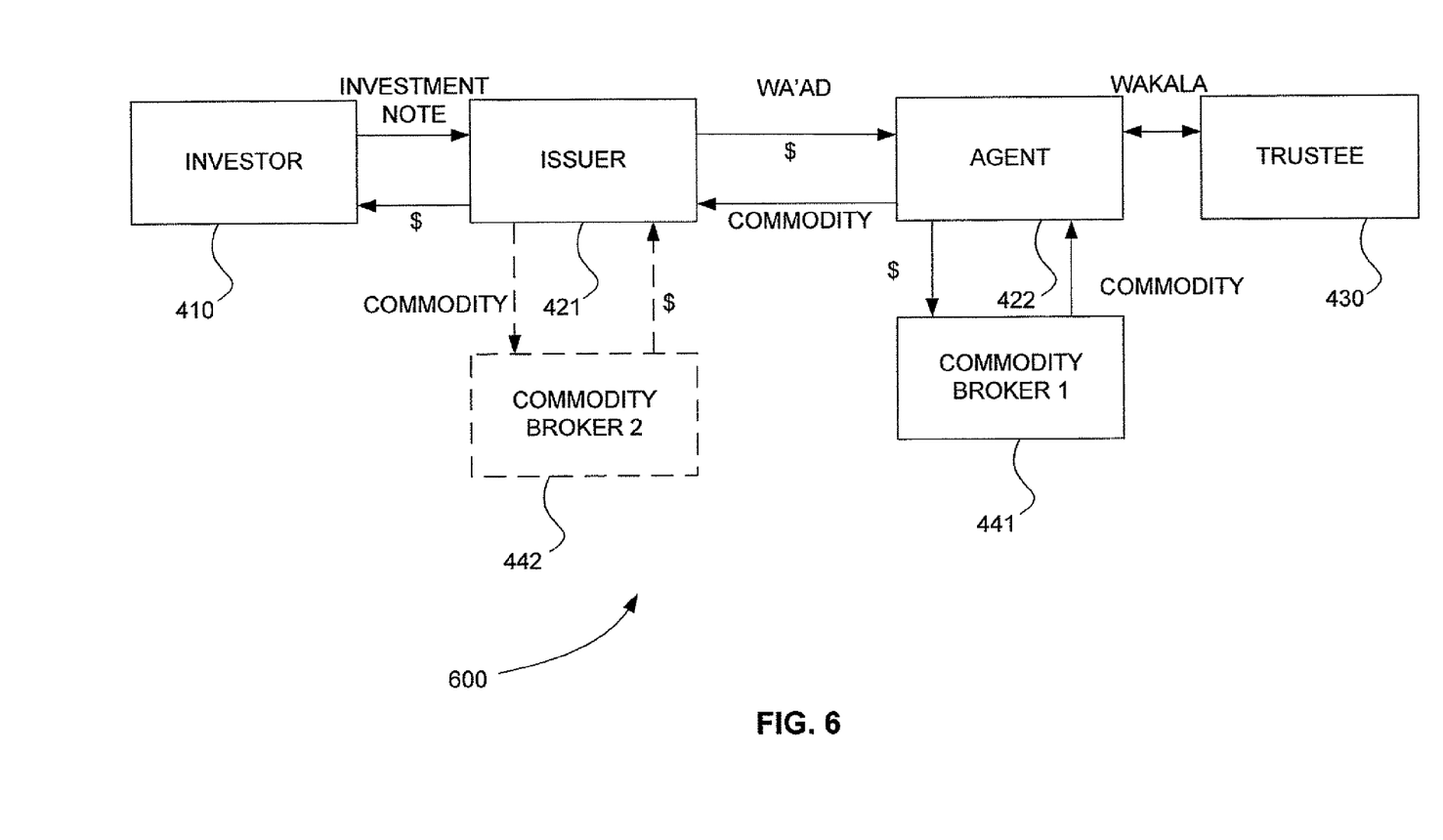
FIG. 6 is a schematic diagram of a system for redeeming Sharia compliant performance linked notes, in accordance with an embodiment of the present invention.

FIG. 6 is a schematic diagram of a system 600 for redeeming Sharia compliant performance linked notes, in accordance with an embodiment of the present invention. System 600 includes investor 410, issuer 421, agent 422, trustee 430, commodity broker 441, and commodity broker 442. On a maturity date, agent 422, as agent of trustee 430, purchases one or more commodities from commodity broker 441. Agent 422 purchases base metal from commodity broker 441 on spot delivery and payment terms, for example. Immediately (e.g., in the same day), issuer 421 (as principal) buys the one or more commodities from agent 422 (as agent of trustee 430). Issuer 421 buys base metal from agent 422 on spot delivery and payment terms in accordance with the Wa'ad.

The purchase price is determined in accordance with a formula and need not be determined with regard to the market value of the one or more commodities. The performance of aluminum is, for example, $$\frac{(AF - AI)}{AI}$$

where AI is the value of an aluminum index five business days prior to an issue date, and AF is the value of the aluminum index five business days prior to the return payment date. In an alternative embodiment of the present invention, the purchase price paid by issuer 421 is the price of the one or more commodities less the final payment owed to investor 410 under the investment notes and less any fees owed to issuer 421.

In an optional step, as indicated by the dashed lines, issuer 421 immediately (e.g., in the same day) sells the one or more commodities to commodity broker 442. Issuer 421 sells the base metal to commodity broker 442 for spot delivery, for example.

Issuer 421 then pays investor 410 a final payment according to the formula. In return for the final payment, the investment notes are redeemed by issuer 421.

Figure 7:
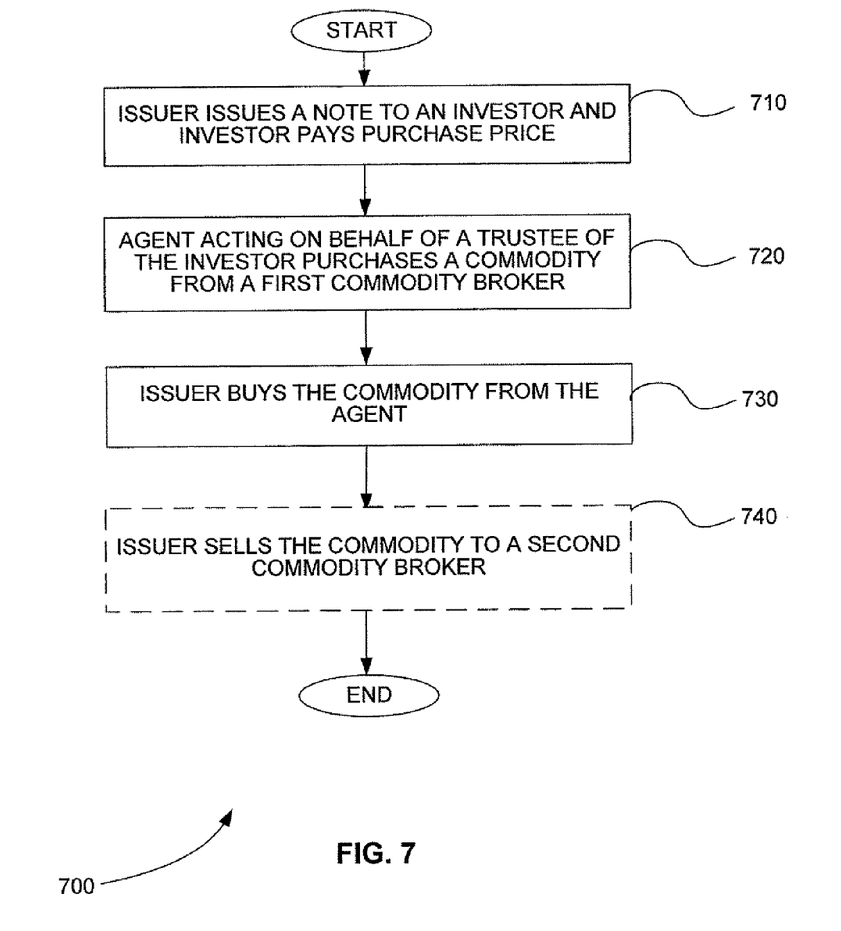
FIG. 7 is a flowchart showing a method for issuing Sharia compliant performance linked notes, in accordance with an embodiment of the present invention.

FIG. 7 is a flowchart showing a method 700 for issuing Sharia compliant performance linked notes corresponding to FIG. 4, in accordance with an embodiment of the present invention.

In step 710 of method 700, an issuer issues a note to an investor in return for a purchase price.

In step 720, an agent purchases a commodity from a first commodity broker. The agent is acting as an agent of a trustee, the trustee is acting on behalf of the investor, and net proceeds of the purchase price satisfy a payment amount under a Wakala entered into between the agent and the trustee. The commodity is a base metal, for example. The amount of the commodity purchased is equal to the net proceeds.

In step 730, the agent sells the commodity to the issuer. The issuer buys the commodity from the agent under a Wa'ad contract.

The issuer can retain the purchased commodity. Optionally, however, in step 740, the issuer can sell the commodity to a second commodity broker.

Figure 8:
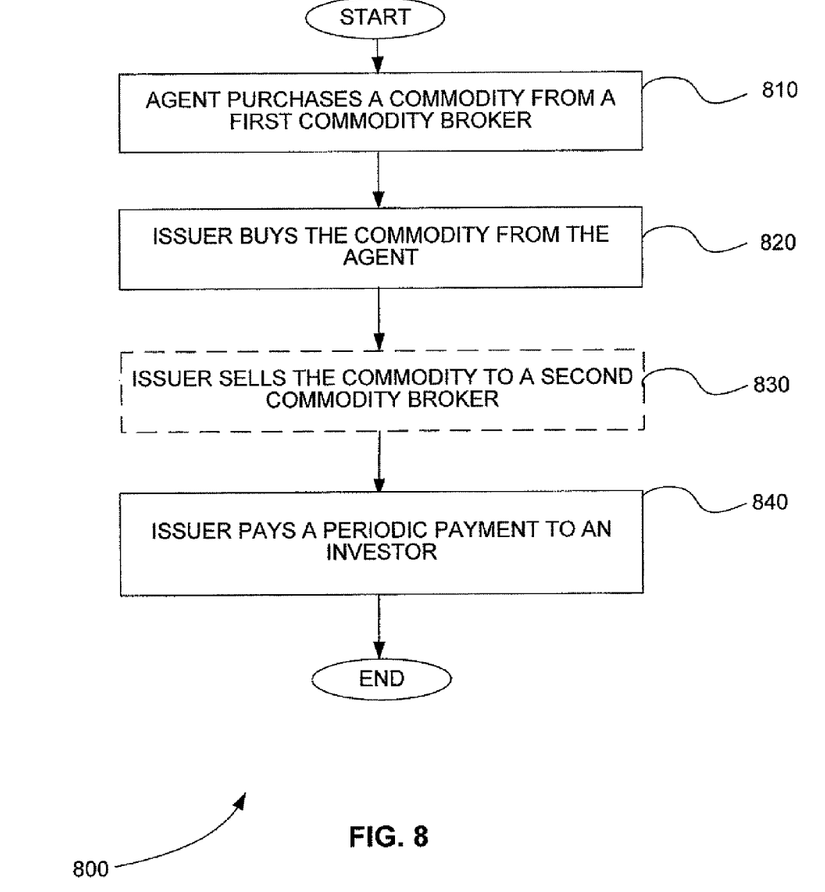
FIG. 8 is a flowchart showing a method for servicing Sharia compliant performance linked notes, in accordance with an embodiment of the present invention.

FIG. 8 is a flowchart showing a method 800 for servicing Sharia compliant performance linked notes corresponding to FIG. 5, in accordance with an embodiment of the present invention.

In step 810 of method 800, an agent purchases a commodity from a first commodity broker. The agent is acting as an agent of a trustee and the trustee is acting on behalf of an investor. The commodity is a base metal, for example. The amount of commodity purchased is equal to a predetermined percentage of the net proceeds, as outlined in the Wa'ad.

In step 820, the issuer buys the commodity from the agent. The purchase price paid by the issuer is determined in accordance with a formula specified in a Wa'ad contract and is equal to the formula determining the servicing of the investment certificate, as described above in reference to FIG. 5. The issuer buys the commodity from the agent under the Wa'ad contract.

The issuer can retain the purchased commodity. Optionally, however, in step 830, the issuer can sell the commodity to a second commodity broker.

In step 840, the issuer pays a periodic payment to the investor based on the formula.

Figure 9:
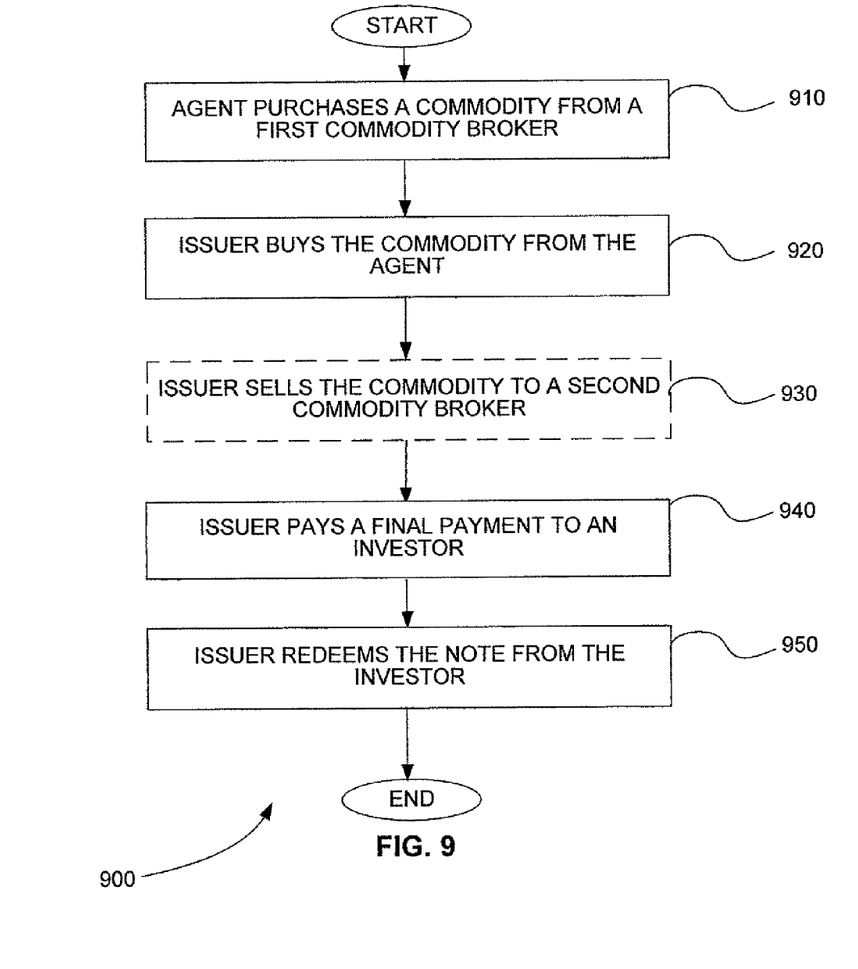
FIG. 9 is a flowchart showing a method for redeeming Sharia compliant performance linked notes, in accordance with an embodiment of the present invention.

FIG. 9 is a flowchart showing a method 900 for redeeming Sharia compliant performance linked notes corresponding to FIG. 6, in accordance with an embodiment of the present invention.

In step 910 of method 900, an agent purchases a commodity from a first commodity broker. The agent is acting as an agent of a trustee and the trustee is acting on behalf of an investor. The commodity is a base metal, for example. The amount of commodity purchased is equal to a predetermined percentage of the net proceeds, as outlined in the Wa'ad. As an example, with reference to steps 720 and 810 above, and assuming net proceeds equal to $100 and four coupon payments each at 5% of the net proceeds, the amount of commodity purchased in step 720 would be $100, the four amounts purchased in step 810 (for each coupon payment date) would be $5, and the final amount purchased would be $80.

In step 920, the issuer buys the commodity from the agent. The purchase price paid by the issuer is determined in accordance with a formula specified in a Wa'ad contract and is equal to the formula determining the redemption of the investment certificate, as described above in reference to FIG. 6. The issuer buys the commodity from the agent under the Wa'ad contract.

The issuer can retain the purchased commodity. Optionally, however, in step 930, the issuer can sell the commodity to a second commodity broker.

In step 940, the issuer pays a final payment to the investor based on the formula.

In step 950, the issuer redeems the note from the investor.

The present invention therefore provides a Sharia compliant commodity linked product. In particular, and in contrast to traditional investment notes such as described in reference to FIGS. 1-3, the present invention links the performance of the issued investment certificate to a beneficial interest in a single commodity, while at the same time basing the overall performance of the investment certificate on a diversified basket of commodities. The link to the beneficial interest in the one commodity satisfies the Sharia principles. However, the use of a diversified basket of commodities ensures that the investor is not exposed to market risks of the single commodity, and instead enjoys a more balanced and safer return based on the diversified commodities. For example, the basket performance can be the equally weighted performance of copper and aluminum, each determined according to the formulas discussed above.

The issued investment certificate has an associated physical title in a linked physical asset. The associated physical title is to, for example, a physical commodity, such as a metal or oil, which is purchased on behalf of the trustee. The title to a physical commodity, in conjunction with the use of the Wakala and Wa'ad agreements, enables the investment note of the present invention to comply with Sharia principles, and permits the present invention to be tradable in accordance with Sharia principles. As used in this context, the term "tradable" means that an Islamic investor may sell and a subsequent investor may buy or sell, in accordance with Sharia principles.

In one implementation of this tradable structure, the issuer issues an English law governed secured investment certificate, available in both zero coupon and profit participation (coupon payment) format. The return on the investment certificate is determined in accordance with a formula linked to the performance of an individual commodity or basket of commodities.

The investment certificate is secured upon the obligations of issuer 421 and agent 422 under the Wakala and the Wa' ads and over the physical commodities. The investor holds an undivided beneficial interest in the physical commodities, through the security created in favor of the trustee, held for the benefit of the investors. The trustee's beneficial interest in the commodity provides investor 410 with the beneficial interest necessary to comply with Sharia principles. The trustee can be, for example, a professional third party trustee, independent of the agent, with its appointment, duties, and responsibilities documented in an English law governed trust deed.

The investment certificates can be issued in a series of standalone secured issues (and would not, for example, be issued under a medium term note program), so that Sharia compliant and conventional securities are not issued under the same issuance platform (from a Sharia perspective, it is preferable not to mix Sharia compliant and non-Sharia-compliant investments).

If coupon paying, the investment certificate can make certain periodic payments, the amount of which is linked to the performance of the commodity basket in accordance with a formula. Such payment can be effected through the Wa'ads.

In an exemplary implementation of a tradable investment certificate of the present invention, a Wakala agreement is structured as follows. Referring to FIG. 4, for example, on the issue date, agent 422 enters into an English law governed Wakala with the trustee 430 (acting on behalf of investor 410) under which agent 422, as agent (Wakeel) for the trustee 430, procures from a third party (commodity broker 1) delivery of the physical commodities to the trustee (acting on behalf of the investors). The agent 422 procures title to the physical commodities on behalf of the trustee 430 as described in more detail below.

The payment for the physical commodities is made on the date on which such contract for the purchase of the physical commodities is entered into. Agent 422 receives a fixed amount on the issue date equal to the subscription proceeds of the investment certificate less fees (i.e., net proceeds). The obligation of the trustee 430 to make payment under the Wakala is satisfied upon receipt by issuer 421 of the net proceeds of the investment certificate from investor 410.

The investment certificate is secured upon the obligations of issuer 421 and agent 422 under the Wakala and the Wa'ads and over the physical commodities. Such security provides the investor 410 with the necessary beneficial interest.

Under the terms of the security, agent 422 is entitled to freely trade the physical commodities as agent (Wakeel) of the trustee 430. The security over the physical commodities is released to facilitate such trading. The Wakala can require that the trading activity shall: (a) ensure that a set percentage of the physical commodities will be procured by the agent (Wakeel) prior to each coupon payment date; and (b) cease prior to the maturity date such that on the maturity date a set percentage of the physical commodities are held on the maturity date (the set percentage of the physical commodities is 100% minus the percentage previously delivered under prior Wa'ads).

The Wakeel procures physical title on behalf of the trustee 430 prior to any secondary trading in the investment certificates.

The agent 422 accounts to the trustee 430 (acting on behalf of investor 410) for any profits incurred on trading the physical commodities. Such profit is accumulated by acquiring further physical commodities with trading profit. Such trading profit if any, is capped at the purchase amount under the Wa'ad. The agent 422 preferably has no liability under the Wakala for the exercise of its discretion regarding the trading of the physical commodities.

The physical commodities comprise at least one of the commodities in the commodity basket and, in respect of the initial purchase of the physical commodities, have a market value not less than the net proceeds.

In an exemplary implementation of a tradable investment certificate of the present invention, Wa'ad agreements are structured as follows. On the issue date, issuer 421 creates a number of Wa'ads under which it undertakes to the trustee 430 (acting on behalf of investors 410) to purchase: (a) a set percentage of the physical commodities on each date corresponding to a coupon payment date under the investment certificate; and (b) a set percentage of the physical commodities on the maturity date.

Upon payment of the purchase price under the Wa'ads, determined in accordance with a formula (e.g., identical to that used to calculate the coupon payment and redemption amount under the investment certificates), the payment under the Wa'ad is used by the trustee 430 to satisfy the coupon payment under the investment certificate or, in the case of the final Wa'ad, the final coupon payment and redemption amount under the investment certificates. The trustee 430 instructs issuer 421 to make such payments due under the Wa'ads to the paying agent under the investment certificates. Upon each payment under the Wa'ad, the trustee 430 may execute a deed of conveyance to transfer title to the physical commodities to the issuer 421.

The security over the physical commodities is released in part upon each payment under a Wa'ad, and in whole upon payment under the final Wa'ad.

Regarding physical title, the agent (Wakeel) of the trustee on the issue date enters into an agreement with each of a first and second commodity broker for the purchase and sale of a commodity (e.g., base metal) in a notional amount equal to the net proceeds. Physical title to the commodity vests not later than the maturity date. Evidence of physical holding can be shown by a statement from the broker.

In a specific implementation in which oil is the physical commodity, the agent of the trustee enters into a counterparty contract for the purchase and sale of oil in a notional amount equal to the net proceeds. Physical title to the oil vests no later than the maturity date. Evidence of the physical holding at a hub can be shown through shipping records and delivery statements.

If the physical commodities have been traded, this procedure is repeated to ensure that the trustee has title to the set percentage on each of the coupon payment dates and the maturity date. The investment certificate is therefore tradable on dates that the trustee holds physical title to the physical commodities.

Nontradable Structure

The embodiments described above relate to a tradable structure, in which, under Sharia, an investor may dispose of the Sharia compliant investment certificate prior to maturity either to a subsequent purchaser or by sale back to the issuer. An alternative embodiment provides a nontradable structure in which an investor may not dispose of the Sharia compliant investment certificate prior to maturity either to a subsequent purchaser or by sale back to the issuer. In this alternative embodiment, the agent of the trustee buys the commodity only at the maturity date. An exemplary method for implementing this alternative nontradable embodiment is as follows.

Initially, an investment certificate is issued by the issuer. The investment certificate could be, for example, an English law governed zero coupon secured investment certificate. The investor pays the purchase price in cash to the issuer and receives the investment certificate. The net proceeds of the issue satisfy the payment amount under a Wakala entered into between the agent and the trustee. Then, on the maturity date, the agent acting as the agent of the trustee purchases a commodity (e.g., base metal) from a first commodity broker on spot delivery and payment terms. The agent, acting as agent of the trustee, then immediately (e.g., in the same day) sells the commodity to the issuer (acting as the principal) on spot delivery and payment terms in accordance with a Wa'ad. The purchase price is determined in accordance with a formula (as described above with respect to tradable embodiment), and is not determined with regard to the market value of the commodity. The purchase price is then paid to the paying agent under the investment certificates to make the redemption payment under the investment certificates. Optionally, the issuer (acting as the principal) can immediately (e.g. in the same day) sell the commodity to a second commodity broker for spot delivery.

In this nontradable embodiment, the return on the investment certificate is determined in accordance with a formula linked to the performance of an individual commodity or basket of commodities. The investment certificate is also secured upon the issuer's and agent's obligations under the Sharia Wakala and Wa'ad contracts and the physical commodities. The investor holds an undivided beneficial interest in the physical commodities through the security created in favor of the trustee, held for the benefit of the investors. The trustee can be, for example, a professional third party trustee independent of the agent, with its appointment, duties, and responsibilities documented in an English law governed trust deed.

The investment certificates can be issued in a series of standalone secured issues (and would not, for example, be issued under a medium term note program), so that Sharia compliant and conventional securities are not issued under the same issuance platform (from a Sharia perspective, it is preferable not to mix Sharia compliant and non-Sharia-compliant investments).

In an exemplary implementation of a nontradable investment certificate of the present invention, a Wakala agreement is structured as follows. On the issue date, the agent enters into an English law governed Wakala with the trustee (acting on behalf of the investors) under which the agent, as agent (Wakeel) for the trustee (acting on behalf of the investors), procures from a first commodity broker the delivery of physical commodities to the trustee (acting on behalf of the investors) in the manner set out below regarding physical title.

The payment for the physical commodities is made on the date on which such contract for the purchase of the physical commodities is entered into.

The issuer receives a fixed amount on the issue date equal to the subscription proceeds of the investment certificates less fees (the "net proceeds"). The obligation of the trustee to make payment under the Wakala is satisfied upon receipt by the issuer of the net proceeds of the investment certificates from the investors.

On the maturity date, the agent procures from the first commodity broker physical title to the physical commodities in the name of the trustee (acting on behalf of the investors). The physical commodities can be comprised of at least one of the commodities in the commodity basket and, in respect of the initial purchase of the physical commodities, have a market value not less than the net proceeds.

In an exemplary implementation of a nontradable investment certificate of the present invention, a Wa'ad agreement is structured as follows. On the issue date, the agent creates a Wa'ad (or a unilateral purchase agreement—consequently executed as a deed) under which it undertakes to the trustee (acting on behalf of the investors) to purchase from the trustee the physical commodities at a purchase price equal to the redemption amount under the investment certificate (determined in accordance with a formula (e.g., identical to that used to calculate the coupon payment/redemption amount under the investment certificates)).

The Wa'ad provides for the proceeds necessary to extinguish the redemption obligation under the investment certificate. Upon receipt of the redemption proceeds, the trustee executes a deed of conveyance transferring the physical commodities to the agent. The trustee instructs the agent to make such payments due under the Wa'ads to the paying agent under the investment certificates.

Regarding physical title, the agent of the trustee enters into an agreement with each of a first and second commodity broker (plus a confirmation for each buy and sell trade) for the purchase and sale of a commodity (e.g., a base metal) in a notional amount equal to the net proceeds. Physical title to the commodity vests no later than the maturity date. Evidence of the physical holding at a hub can be shown through a statement from a broker, or from shipping records and delivery statements.

In a specific implementation in which oil is the physical commodity, the agent of the trustee enters into a counterparty contract for the purchase and sale of oil in a notional amount equal to the net proceeds. Physical title to the oil vests no later than the maturity date. Evidence of the physical holding at a hub can be shown through shipping records and delivery statements.

The investment certificates are secured upon the obligations of the issuer and agent under the Wakala and the Wa'ads and over the physical commodities. Such security provides the investors with the beneficial interest necessary under Sharia.

Although, for illustration purposes, embodiments of the present invention (whether tradable or nontradable) describe linking the performance of an investment note to a beneficial interest in a commodity, the beneficial interest could be in any physical asset, such as real property.

In addition, although aspects of the embodiments of the present invention described above relate to English law, the methods and structures of the transactions of the present invention are not dependent upon the laws of a particular country, and can be implemented in any country, including the United States.

In addition, although embodiments of the present invention illustrate the payment of coupons in conjunction with an issued investment note linked to the performance of a basket of commodities and tradable under Sharia principles, the present invention does not require these coupon payments. Indeed, the present invention applies to non-coupon paying investment notes, which are issued and redeemed according to the structures and processes described above.

In a further embodiment of the present invention, a tradable or nontradable investment note is 100% principal protected on the maturity date. As such, the worst case scenario for the investor is that if held to maturity, the investment note redeems at 100%. If the investment note is sold prior to maturity, the investor takes the market risk. In all cases, the investor takes the bank's credit risk.

In an aspect of the present invention, investment notes are a combination of traditional debt issuance, English law governed specific Islamic contracts, and English law/New York law commodity purchase/sale agreements.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously provide for the issuing, servicing, and redemption of investment notes linked to the performance of a basket of commodities and tradable under Sharia principles.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered examples appended hereto, and by their equivalents.

What is claimed is:

1. A method implemented by a computer system for administering an investment note compliant with Sharia principles, the investment note issued by an issuer to an investor, the method comprising:
   receiving from the investor through the computer system a purchase payment for the investment note;
   issuing, through the computer system, the investment note to the investor;
   paying by the issuer to an agent net proceeds of the purchase payment, via the computer system, wherein an agency contract is established between the agent and a trustee, wherein the agent acts on behalf of the trustee and the trustee acts on behalf of the investor, and a unilateral purchase agreement is established between the agent and the issuer under which the issuer promises to buy commodities from the agent, wherein the net proceeds satisfy a payment amount under the agency contract;
   purchasing a commodity by the agent, via the computer system, such that the agent holds title to the commodity on behalf of the trustee on the same day that the investment note is issued; and
   selling, via the computer system, the commodity by the agent to the issuer under the unilateral purchase agreement.

2. The method of claim 1, wherein the net proceeds comprise subscription proceeds of the investment note less fees.

3. The method of claim 1, wherein the commodity comprises at least one of oil, a base metal, and a precious metal.

4. The method of claim 1, wherein selling the commodity by the agent to the issuer comprises selling the commodity for a price determined in accordance with a formula and without regard to a market value of the commodity.

5. The method of claim 4, wherein the formula comprises $$\frac{ComF - ComI}{ComI}$$

where ComI is the value of an index of the commodity five business days prior to an issue date, and ComF is the value of the index of the commodity five business days prior to the return payment date.

6. The method of claim 1, wherein selling the commodity by the agent to the issuer comprises selling the commodity on the same day that the investment note is issued.

7. The method of claim 1, wherein the commodity comprises a single commodity, and wherein the method further comprises basing the overall performance of the investment certificate on a plurality of commodities.

8. The method of claim 1, wherein purchasing the commodity by the agent comprises purchasing an amount of the commodity equal to the net proceeds.

9. The method of claim 1, wherein, under the unilateral purchase agreement, the issuer undertakes to the trustee to purchase the commodity on the maturity date of the investment note, and wherein, on the maturity date, the method further comprises:
   purchasing the commodity by the agent such that the agent holds title to the commodity on behalf of the trustee on the maturity date;
   selling the commodity by the agent to the issuer for a purchase price; and
   paying the investor a redemption amount using the purchase price.

10. The method of claim 1, wherein, under the unilateral purchase agreement, the issuer undertakes to the trustee to purchase a predetermined percentage of the commodity for each of the dates corresponding to a coupon payment date under the investment note and for the maturity date of the investment note, wherein, for each coupon payment date, the method further comprises:
   purchasing the predetermined percentage of the commodity for the each coupon payment date by the agent such that the agent holds title to the predetermined percentage of the commodity for the each coupon payment date on behalf of the trustee on the coupon payment date;
   selling the predetermined percentage of the commodity for the each coupon payment date by the agent to the issuer for a first purchase price; and
   paying the investor a coupon payment using the first purchase price, and
   wherein, on the maturity date, the method further comprises:
   purchasing the predetermined percentage of the commodity for the maturity date by the agent such that the agent holds title to the predetermined percentage of the commodity on behalf of the trustee on the maturity date;
   selling the predetermined percentage of the commodity for the maturity date by the agent to the issuer for a second purchase price; and paying the investor a redemption amount using the second purchase price.

11. The method of claim 10, wherein the first purchase price and the second purchase price are determined in accordance with a formula and without regard to a market value of the commodity.

12. The method of claim 10, further comprising, for each of the coupon payment dates and the maturity date, completing a deed of conveyance transferring from the agent to the issuer title to the predetermined percentage of the commodity.

13. The method of claim 10, further comprising releasing the investor's security over the commodity in part upon each coupon payment and in whole upon payment of the redemption amount.

14. The method of claim 1, wherein the purchasing of the commodity by the agent and the selling of the commodity by the agent are made on spot delivery and payment terms.

15. A method implemented by a computer system for issuing a Sharia compliant performance linked note, comprising:
- issuing, through the computer system, the note from an issuer to an investor in return for a purchase price;
- purchasing, through the computer system, a commodity by an agent from a first commodity broker, wherein the agent is acting as an agent of a trustee, the trustee is acting on behalf of the investor, wherein net proceeds of the purchase price satisfy a payment amount under a Wakala entered into between the agent and the trustee, and wherein the commodity is purchased in an amount equal to the net proceeds; and
- selling, via the computer system, the commodity by the agent to the issuer.

16. The method of claim 15, wherein the commodity comprises one of oil, a base metal, and a precious metal.

17. The method of claim 15, further comprising selling the commodity from the issuer to a second commodity broker, wherein purchasing the commodity by the agent, selling the commodity by the agent, and selling the commodity by the issuer occur on the same day.

18. A method implemented by a computer system for servicing a Sharia compliant performance linked note issued to an investor by an issuer, comprising:
- purchasing, through the computer system, a predetermined percentage of a commodity for each coupon payment date by an agent such that the agent holds title to the predetermined percentage of the commodity for the each coupon payment date on behalf of a trustee on the coupon payment date, wherein a Wa'ad is established between the agent and the issuer under which the issuer promises to buy the predetermined percentage of the commodity for each of the dates corresponding to the coupon payment date under the note, wherein the agent is acting as an agent of a trustee and the trustee is acting on behalf of the investor;
- selling, via the computer system, the predetermined percentage of the commodity for the each coupon payment date by the agent to the issuer for a purchase price determined in accordance with a formula and without regard to a market value of the commodity; and
- paying the investor a coupon payment using the purchase price.

19. The method of claim 18, wherein the commodity comprises one of oil, a base metal, and a precious metal.

20. The method of claim 18, further comprising selling the commodity by the issuer to a commodity broker, wherein purchasing by the agent, selling by the agent, and selling by the issuer occur on the same day.

21. A method for redeeming a Sharia compliant performance linked note on a maturity date issued to an investor by an issuer, comprising: purchasing a commodity, through the computer system, on the maturity date, by an agent such that the agent holds title to the commodity on behalf of the trustee on the maturity date, wherein a Wa'ad is established between the agent and the issuer under which the issuer promises to buy the commodity on the maturity date, the agent is acting as an agent of a trustee and the trustee is acting on behalf of the investor; selling, via the computer system, the commodity by the agent to the issuer for a purchase price; and paying the investor a redemption amount using the purchase price.

22. The method of claim 21, wherein the commodity comprises one of oil, a base metal, and a precious metal.

23. The method of claim 21, further comprising selling the commodity from the issuer to a commodity broker, wherein purchasing by the agent, selling by the agent, and selling by the issuer occur on the same day.

* * * * *